United States Patent
Franks et al.

[11] 3,800,995
[45] Apr. 2, 1974

[54] TWIN-SPINDLE INERTIA WELDING MACHINE

[75] Inventors: Douglas G. K. Franks; Ira H. Sage, both of Peoria, Ill.

[73] Assignee: Production Technology, Inc., Peoria, Ill.

[22] Filed: Aug. 25, 1972

[21] Appl. No.: 283,703

[52] U.S. Cl............................ 228/2, 29/470.3, 156/73
[51] Int. Cl............................................... B23k 27/00
[58] Field of Search............ 228/2; 29/470.3; 156/73

[56] References Cited
UNITED STATES PATENTS

| | | | |
|---|---|---|---|
| 3,388,849 | 6/1968 | Blum et al. | 228/2 |
| 3,610,507 | 10/1971 | Kiwalle | 228/2 |
| 3,613,218 | 10/1971 | Kiwalle | 228/2 X |
| 3,613,982 | 10/1971 | Hallenberg | 29/470.3 X |
| 3,727,298 | 4/1973 | Gage et al. | 228/2 X |

*Primary Examiner*—J. Spencer Overholser
*Assistant Examiner*—Robert J. Craig
*Attorney, Agent, or Firm*—Fryer, Tjensvold, Phillips & Lempio

[57] ABSTRACT

An inertia welding machine includes a pair of axially movable spindle assemblies arranged in facing relation with a non-rotating fixture arranged between the two spindle assemblies. A single drive train including a flywheel is coupled to both of the spindle assemblies through a synchronizing shaft. Preferably, a clutch is arranged between the flywheel and the two spindles to allow very precise control over the final length of weld parts joined by the machine and one of the spindle assemblies is selected to have a slightly increased rotating mass to overcome a tendency for angular misalignment between the two spindle assemblies.

7 Claims, 7 Drawing Figures

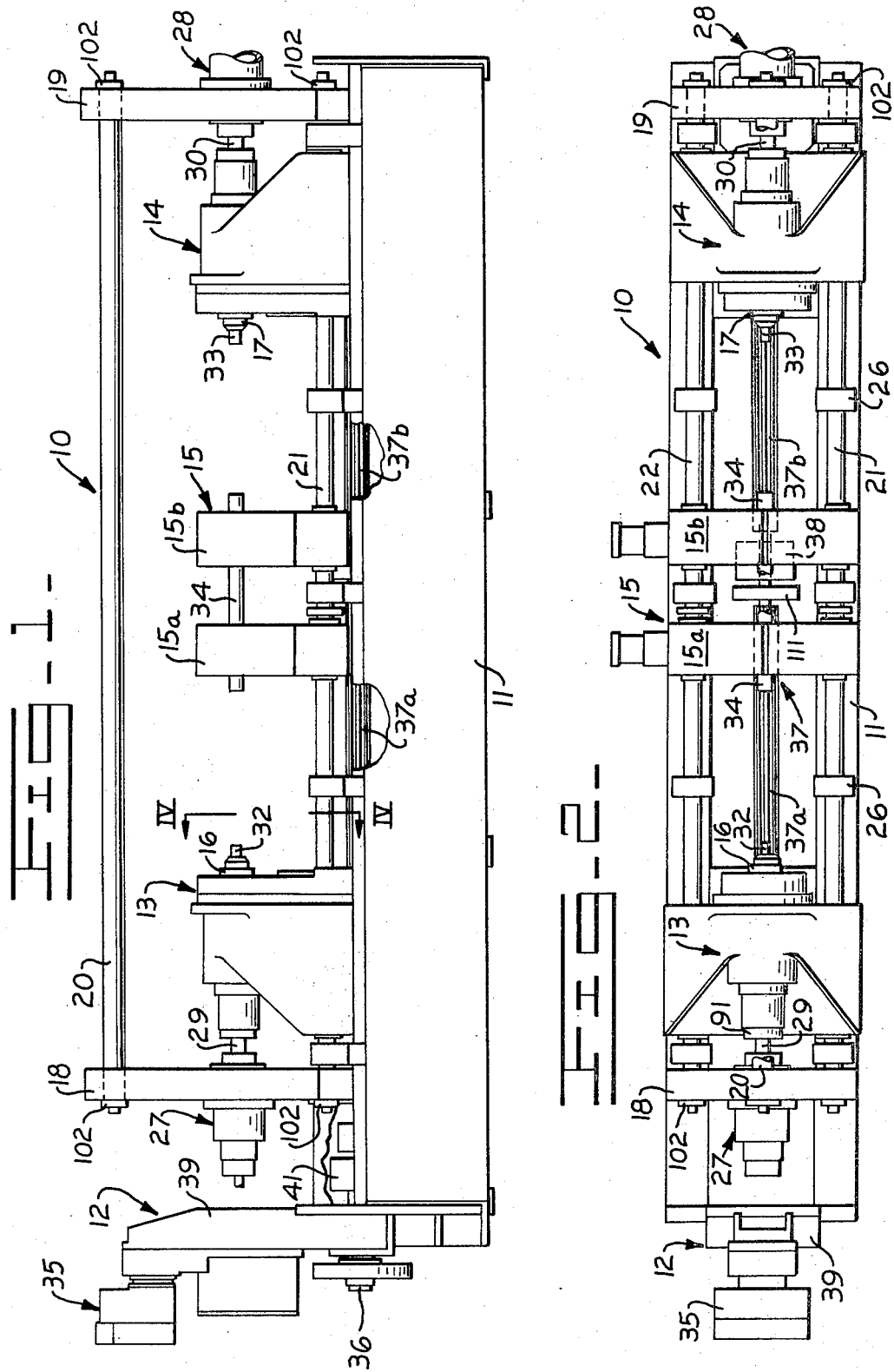

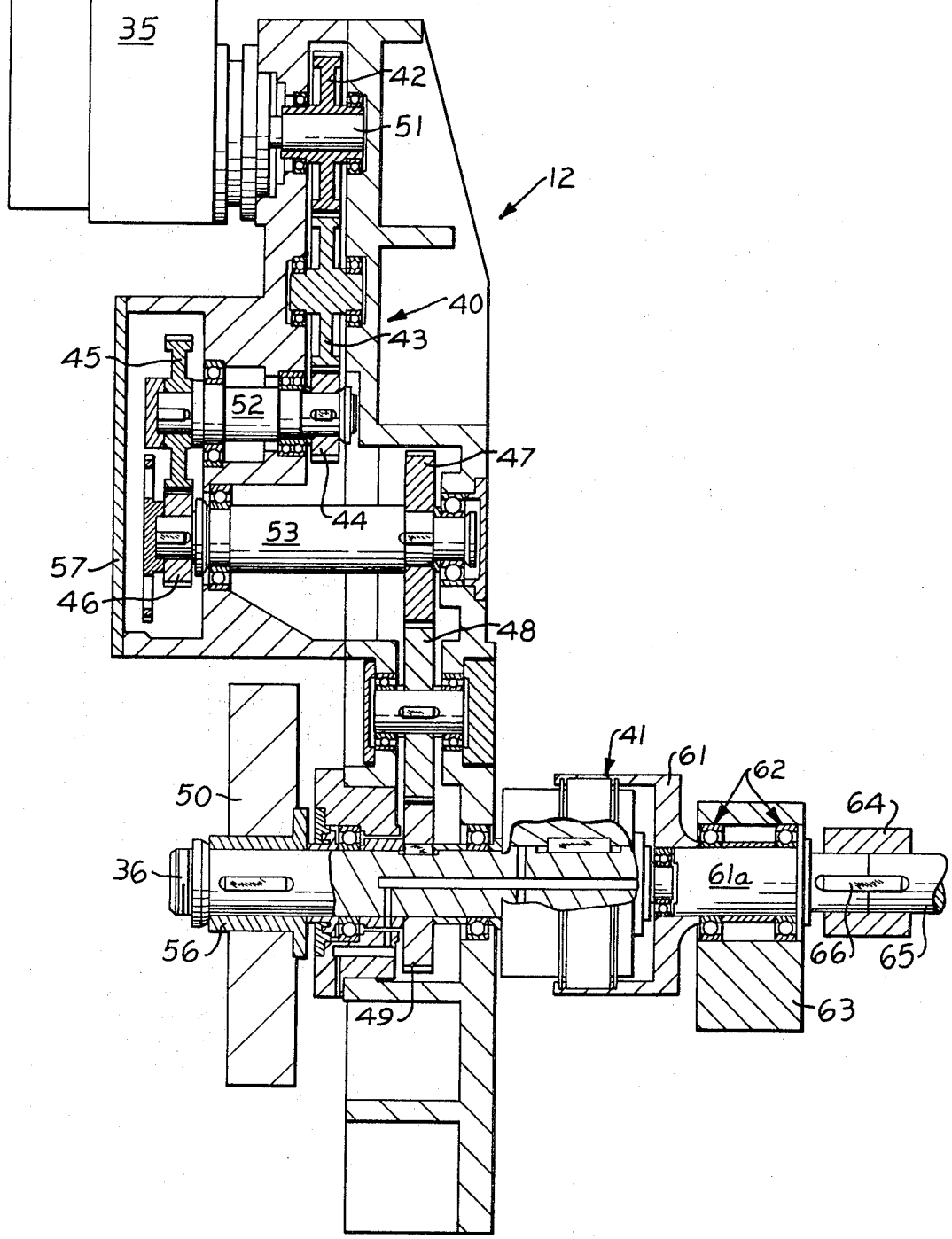

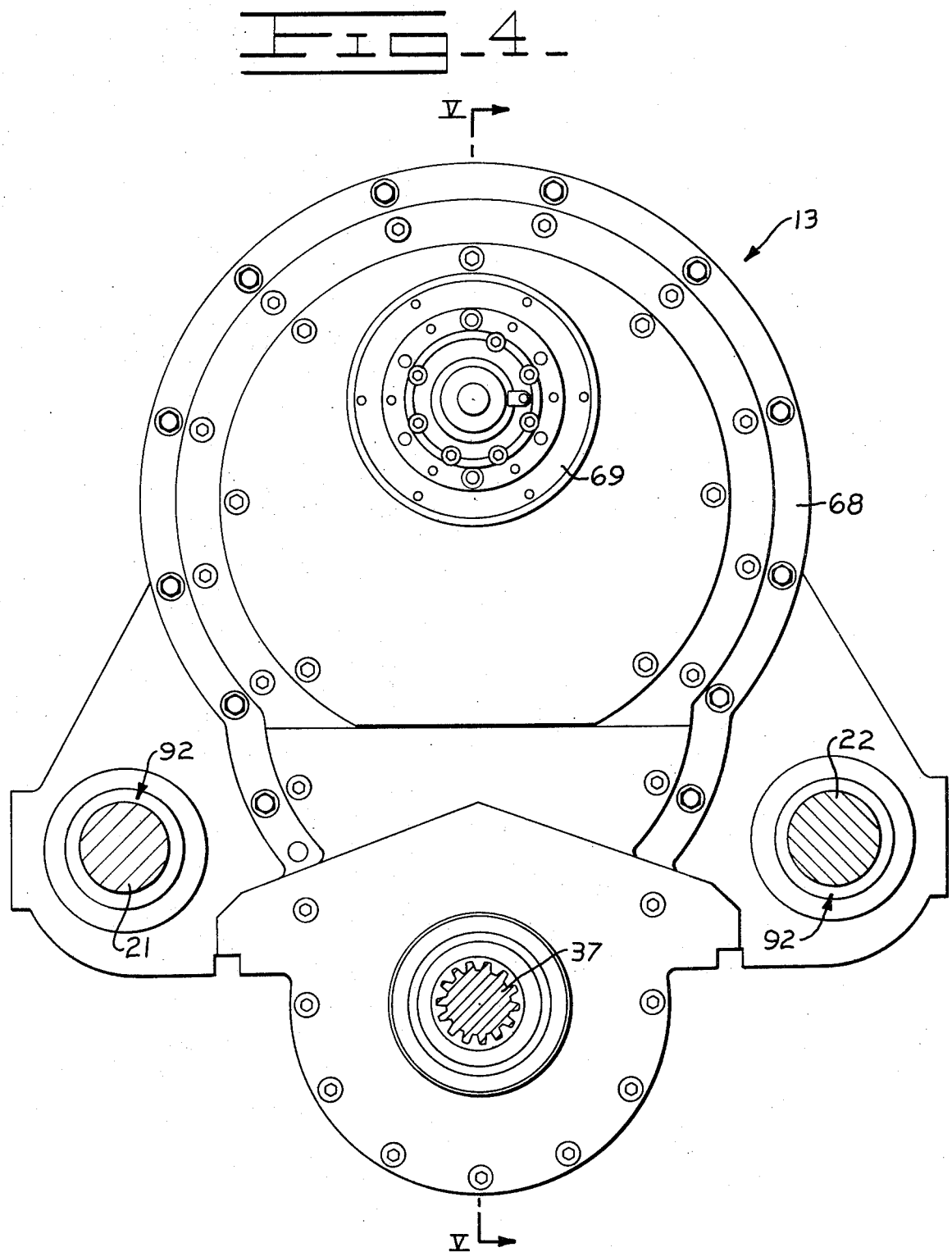

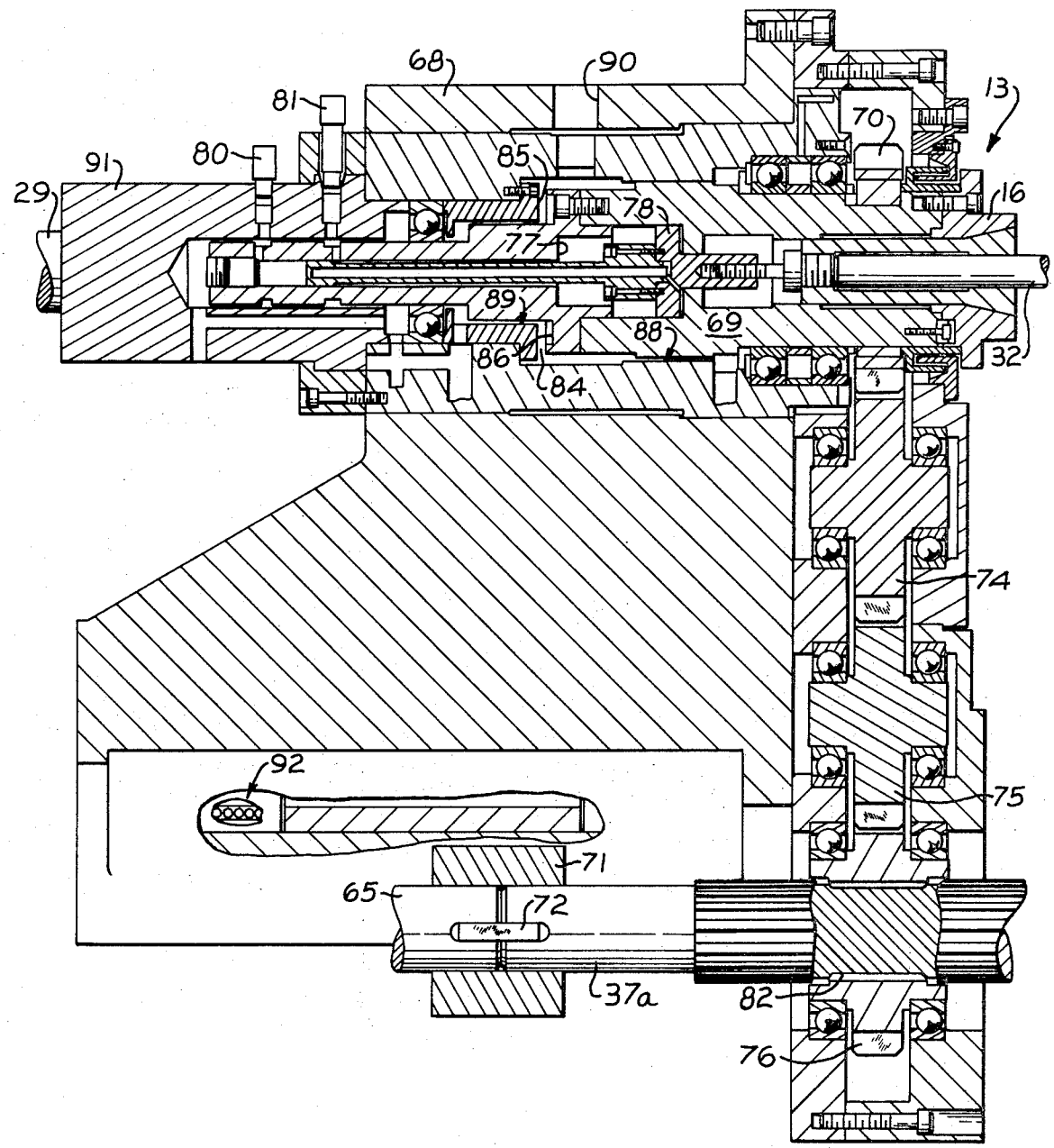
FIG_5_

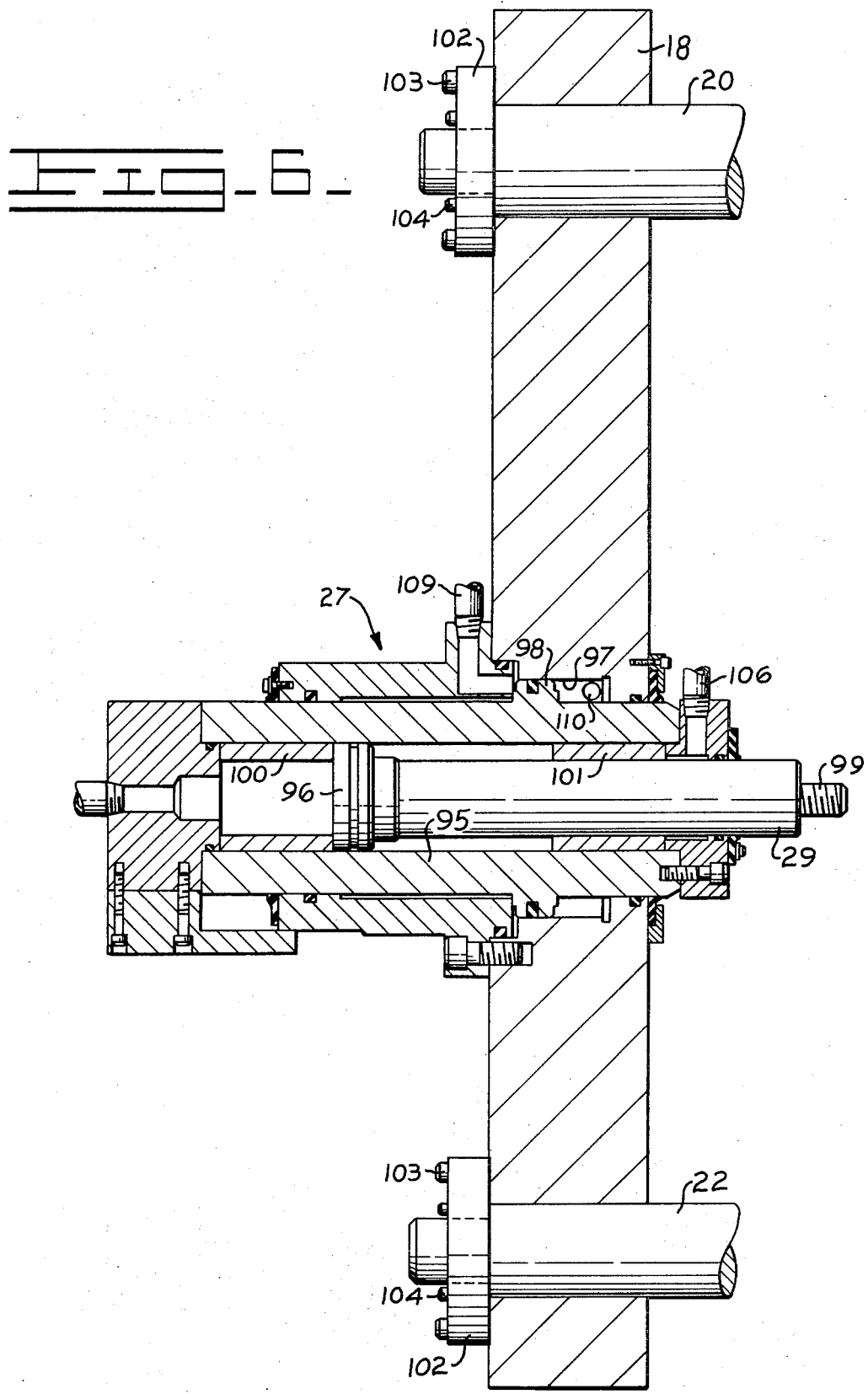
FIG_6_

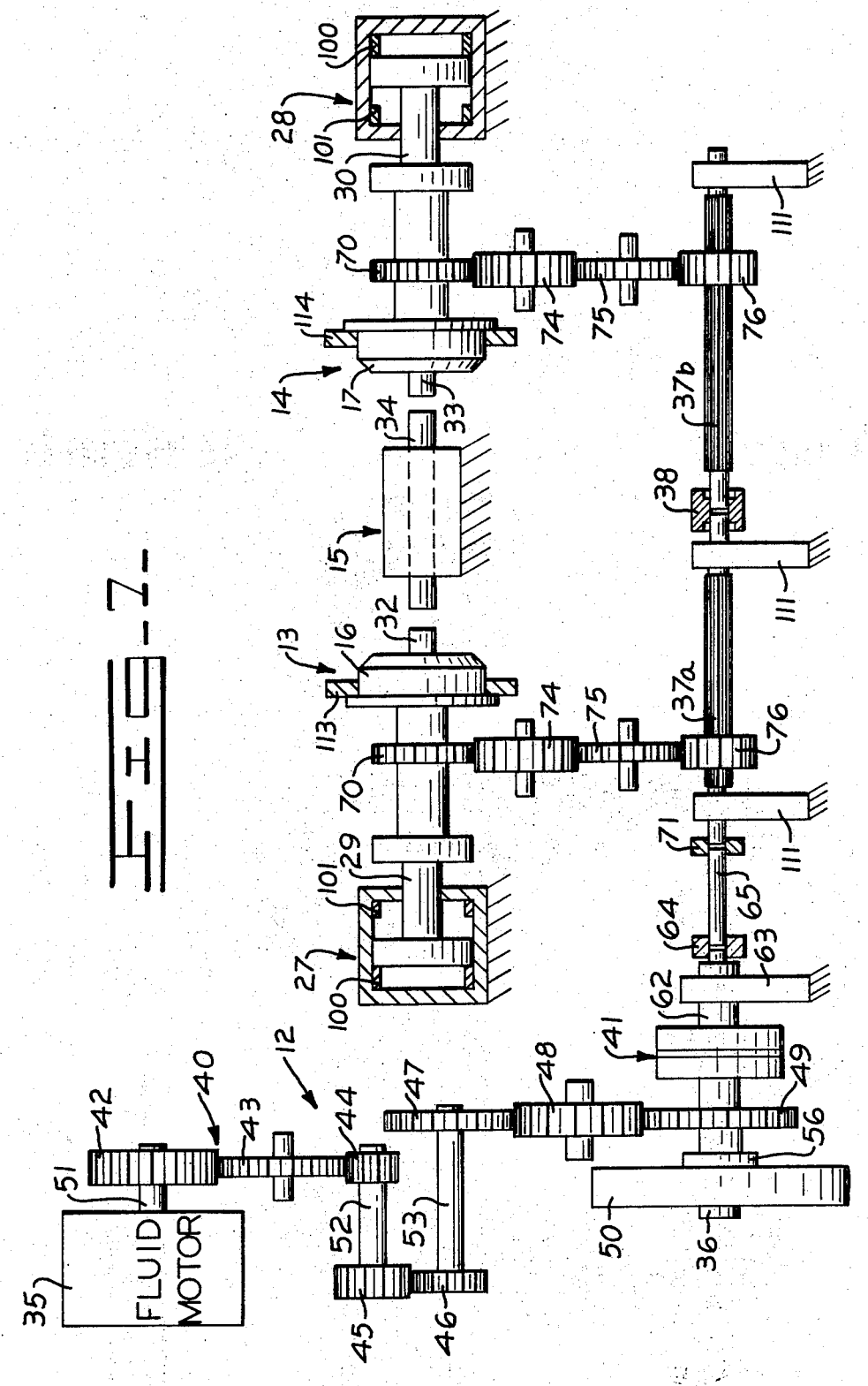

TWIN-SPINDLE INERTIA WELDING MACHINE

BACKGROUND OF THE INVENTION

The present invention relates to an inertia welding machine and more particularly to such a machine having opposed rotatable spindle assemblies with a non-rotating fixture mounted between the spindles to support either a single weld part or two separate weld parts in axial alignment with weld parts mounted in the spindle assemblies.

Prior art inertia welding machines have included axially aligned holding fixtures for simultaneously accomplishing multiple bonds. However, these machines are relatively limited in terms of welding applications for which they are suited.

The present invention is intended to provide a versatile inertia welding machine capable of performing inertia welds in a number of different applications.

SUMMARY OF THE INVENTION

The twin-spindle inertia welding machine of the present invention includes a pair of rotatable spindle assemblies mounted in facing relation with a non-rotating fixture disposed therebetween. With such an arrangement, the non-rotating fixture may be adapted to secure a single weld piece or a pair of separate weld pieces in axial alignment with the two spindle assemblies.

To simplify operation of the machine in accomplishing a bond at two interfaces, a single drive train including a flywheel capable of delivering a substantial amount of the rotational energy required for both spindles is coupled with the two spindles through a synchronizing shaft. Preferably, the synchronizing shaft is constructed in two portions which are secured together by a coupling capable of allowing angular adjustment of the two shaft portions.

A clutch is preferably arranged between the single drive train and the two spindles to allow for very precise control over the finished length of a bonded weld piece in a manner described in greater detail below.

Other objects and advantages of the present invention are made apparent in the following description having reference to the accompanying drawings.

BRIEF DESCRIPTION OF THE DRAWINGS

FIG. 1 is a side view in elevation of a twin-spindle inertia welding machine constructed according to the present invention.

FIG. 2 is a plan view of the machine illustrated in FIG. 1.

FIG. 3 is a fragmentary side view, with parts in section, of a drive train which also is shown at the left end of FIGS. 1 and 2.

FIG. 4 is a view taken along section line IV—IV of FIG. 1 to more clearly illustrate the construction of one of the spindle assemblies in the machine.

FIG. 5 is a view taken along section line V—V of FIG. 4 to illustrate internal components of the spindle assembly.

FIG. 6 is an enlarged fragmentary view, with parts in section, of a fixed tailstock assembly associated with one of the spindle assemblies.

FIG. 7 is a generally schematic representation, with parts in section, of the single drive train, synchronizing shaft and spindles to more clearly illustrate the manner in which the single drive train is coupled with the two rotatable spindle assemblies of the machine of FIGS. 1 and 2.

DETAILED DESCRIPTION OF A PREFERRED EMBODIMENT

A twin-spindle inertia welding machine constructed according to the present invention is indicated at 10 in FIGS. 1 and 2. The twin-spindle machine has a base or frame structure 11 for supporting a single drive train 12 and two spindle assemblies 13 and 14 which are arranged in facing relation with each other. A central holding fixture 15 having dual non-rotatable chuck assemblies 15a and 15b is mounted upon the train structure 11 between the two spindle assemblies. The two spindle assemblies 13 and 14 are axially movable in a manner described below while the fixture 15 is preferably secured in place upon the frame structure 11.

Two upright tailstock supports 18 and 19 are secured to opposite ends of the frame 11. Three horizontal tie bars 20, 21 and 22 extend between and provide triangular supports for the upright supports 18 and 19. A plurality of tie bar supports 26 are also arranged in spaced apart relation on the frame 11 to support the tie bars 21 and 22. Both of the spindle assemblies 13 and 14 are slidably supported upon the tie bars 21 and 22 for axial movement relative to the central assembly 15.

Axial movement of the two spindle assemblies is controlled by double-acting hydraulic rams 27 and 28 associated respectively with the upright supports 18 and 19 and operatively coupled with the spindle assemblies 13 and 14 respectively. The double-acting ram 27 is secured to the support 18 and has a piston rod 29 coupled to the spindle assembly 13. Similarly, the hydraulic ram 28 has a piston rod 30 which is secured to the spindle assembly 14.

Weld pieces 32 and 33 are secured for rotation by chuck assemblies 16 and 17 respectively mounted upon the spindle assemblies 13 and 14. A non-rotatable weld piece 34 is shown secured by the fixture 15. Although the non-rotating weld piece 34 is shown as a single part, it may also be replaced by two separate non-rotatable weld pieces (not shown) which would be secured in the dual holding fixtures 15a and 15b of the assembly 15. During a welding operation, the rotatable weld pieces 32 and 33 are moved into abutting engagement with opposite ends of the non-rotatable weld piece 34 by movement of the spindle assemblies 13 and 14 along the tie bars. The machine might be made somewhat more versatile by mounting the non-rotatable fixture 15 for axial movement upon the supporting frame 11. However, for purposes of the present embodiment, the assembly 15 is contemplated as being fixed in place upon the frame 11.

The single drive train 12 comprises a hydrostatic transmission including a hydraulic motor as generally indicated at 35 and a gear train arranged within a housing 39 for coupling the motor 35 with a flywheel shaft 36 (See FIG. 1). The rotatable spindle assemblies are coupled together by a synchronizing shaft 37 which is constructed in two parts, 37a and 37b, which are secured together near the tailstock fixture 15 by an adjustable coupling 38. The flywheel shaft 36 is coupled to the synchronizing shaft 37a by a hydraulically actuated clutch 41. The clutch 41 is adapted to selectively uncouple the single drive train 12 from both spindle assemblies 13 and 14 for a purpose discussed in greater detail below.

The drive train 12 is shown in greater detail in FIG. 3 with the gear train being generally indicated at 40 for coupling the motor 35 with the flywheel shaft 36. The gear train 40 consists of meshing drive gears 42–49. The first drive gear 42 is coupled to an output shaft 51 for the motor 35. The gear 43 is arranged in meshing relation between the gear 42 and another gear 44 which is mounted upon a gear shaft 52 along with another gear 45. The gear 45 in turn meshes with a gear 46 which is mounted upon another gear shaft 53 along with the drive gear 47 which meshes with the final drive gear 49 through the drive gear 48. The last drive gear 49 is secured upon the flywheel shaft 36.

Versatility within the drive train is provided by replaceable mounting of the flywheel 50 upon a flanged portion 56 of the flywheel shaft 36. Additionally, drive gears 45 and 46 are change gears which can be readily replaced by different gears to provide a different drive ratio within the gear train 40. Access to the gears 45 and 46 is facilitated by a removable cover plate 57 mounted upon the housing 39.

The clutch assembly 41, as best seen in FIG. 3, provides a selective coupling between the flywheel shaft 36 and an external clutch housing 61 which has an axially extending shaft portion 61a rotatably mounted in a support block 63 by bearing means 62. The shaft 61a is secured to a spacer shaft 65 by means of a coupling 64. A key 66 penetrates the coupling 64 and shaft 65 to provide a positive drive connection therebetween. The other end of the spacer shaft 65 is coupled to the synchronizing shaft 37a by a second coupling 71 and key 72 as illustrated in FIG. 5 and described in greater detail below.

Referring particularly to FIGS. 4 and 5, each of the spindle assemblies 13 and 14 has a housing 68 rotatably mounting a spindle 69. Each spindle 69 is coupled to the synchronizing shafts 37a or 37b by means of a spindle gear 70, idler gears 74 and 75 and a drive gear 76. A coupling is provided between the spindle chuck 16 and the shaft 37a, for example, by means of intermediate gears 74 and 75 which mesh with the spindle gear 70 and the drive gear 76 which is splined upon the shaft 37a as indicated generally at 82.

The spindle 69 contains a clamping cylinder 77 and piston 78 reciprocably arranged within the cylinder for controlling engagement of the chucks 16 and 17 with the respective rotatable weld pieces. Clamping engagement of the chuck is provided by actuating fluid introduced into the cylinder 77 by way of an external fitting 80 while the chuck is disengaged by means of fluid introduced into the cylinder through another external fitting 81.

A hydrostatic bearing 84 is formed between opposed faces of a thrust bushing 85 and a shaft member 86 for absorbing and transferring welding thrust forces. A controlled forward leakage path 88 and a controlled rearward leakage path 89 are provided for the bearing chamber 84 with hydraulic fluid being introduced into the bearing chamber 84 through an inlet port 90 formed in the spindle housing 68.

A rear housing 91 provides a closure for the spindle interior while coupling the piston rod 29 with the spindle assembly 13. Accordingly, the entire spindle assembly 13 is axially shifted along the supporting tie bar 20–22 by extension or retraction of the piston rod 29.

The spindle 13 remains in rotating engagement with the synchronizing shaft 37a during its axial movement along the tie bars since the synchronizing shafts are splined along the entire length of travel for the respective spindles. A circulating ball bearing mounting 92 facilitates movement of the spindle assembly along the tie bars.

Referring particularly to FIG. 6, it may be seen that the support member 18 and the double-acting hydraulic ram assembly 27 comprise a tailstock assembly for the spindle assembly 13. The hydraulic ram 27 comprises a rapid advance cylinder 95 containing a piston 96 which is secured to the piston rod 29. A thrust cylinder 97 is formed in the upright support 18 with a piston 98 being reciprocably mounted therein. Referring momentarily to FIG. 5, the piston rod 29 is secured to the rear housing 91 of the spindle assembly 13 by means of a threaded stud 99.

Versatility of the welding machines is increased by the provision of spacers 100 and 101 attached respectively to the back of the rapid advance piston 96 (opposite piston rod 29) and to the front of the rapid advance piston 96 to encircle the piston rod 29. The spacer 100 limits reverse travel of the piston 96 and accordingly reduces cycle time for operating the machine. The axial dimension of the spacer is of course selected according to the length of the weld parts secured with the machine. The other spacer 101 limits forward travel of the piston 96, thus increasing the distance between the spindle position illustrated in FIG. 1 and the weld position with the weld pieces brought into axial engagement thus permitting weld parts of different lengths to be welded upon the machine.

It is noted that the position of the upright supports 18 and 19 are fixed relative to the tie bars 20–22 by plate members 102 which are secured to the respective upright supports for example by bolts 103 and to the respective tie bars for example by bolts 104. Actuating fluid is introduced into the cylinder 95 by means of inlet conduits 105 and 106. Fluid introduced through the conduit 105 tends to extend the rod 29 thus shifting the spindle 13 toward the fixed mounting assembly 15 (See FIG. 1) while fluid is introduced through the conduit 106 to retract the rod 29.

The construction and interconnection of the spindle assembly 14 with the synchronizing shaft 37b and tailstock 19 is similar to that described above for the spindle assembly 13, the synchronizing shaft 37a and the tailstock 18.

According to the previous description, it is noted that the spindle assemblies 13 and 14 are respectively driven by the splined synchronizing shaft portion 37a and 37b respectively through drive gears 70, 74, 75 and 76. It is, of course, necessary to provide for a limited amount of back lash or clearance between the gears and also in the splined couplings. It is further noted that angular correlation between the two spindle assemblies 13 and 14 may be more important in some applications than in others. Since the spindle assemblies 13 and 14 will decelerate according to prevailing frictional torque developed at the respective weld interfaces, that is, between weld pieces 32, 34 and 33, 34, angular misalignment of the spindle assemblies 13 and 14 may result. As one solution to overcoming this problem, it is contemplated to provide one or the other of the spindle assemblies with an extra or variable motational moment of inertia. Although the moment of inertia for one of the spindles, for example, that indicated at 14, is preferably contemplated as merely having a slightly increased mass with respect to the other spindle 13, it is also noted that a variable moment of inertia could be provided for one of the spindles 13 and 14. The spindle having a larger moment of inertia will tend to decelerate somewhat slower than the other spindle, thereby tending to prevent backlash in the drive train. The coupling 38 which may be of any conventional design to allow for angular adjustment of the shaft portions 37a and 37b can then be employed to angularly adjust the synchronizing shaft portions 37a and 37b in order to compensate for the backlash. To further increase versatility of the machine, it is contemplated that a light auxiliary flywheel, 113 or 114, could be employable respectively with the spindles 13 and 14.

The preceding description of the single drive train for driving the respective spindles 13 and 14 through the synchronizing shafts 37a and 37b may be more readily seen by reference to FIG. 7. Mounting blocks 111 for supporting the shaft portions 37a and 37b are also best seen in FIG. 7.

In a preferred manner of operating the twin-spindle inertia welding machine as described above, a non-rotatable weld piece 34 is first secured within the holding fixture 15. Rotatable weld pieces 32 and 33 are also secured within the rotatable chucks 16 and 17. Actuating fluid is then introduced into the rapid advance cylinders 95 (through inlet conduit 105) to move the two spindle assemblies 13 and 14 toward the non-rotatable fixture 15 corresponding to a prebond position for the machine. Once the spindles are in this position with the weld pieces axially adjacent each other, the drive train 12 for the machine may be actuated by operating the motor 35.

With the clutch 41 engaged, the flywheel 50 is brought up to a selected speed of rotation by the motor 35 acting through the drive train 40. The selected speed of rotation for the flywheel is preferably selected to provide adequate energy for subsequently driving the spindle assemblies 13 and 14 to affect a completed bond at weld interfaces between the weld pieces 32, 34 and 33, 34.

When the flywheel is rotating at the selected speed, operation of the motor 35 is discontinued and, at approximately the same time, actuating fluid is introduced into the thrust cylinders 97 through inlet ports 109 in order to shift the spindle assemblies 13 and 14 toward the non-rotatable fixture 15 and axially engage the weld pieces under sufficient pressure to accomplish a bond therebetween. Welding energy is supplied from the flywheel 50 and as stored energy from the flywheel is converted into heat at interfaces between the weld pieces, rotating speed of the spindles 13 and 14 and the drive train 12 is rapidly reduced. Prior to stopping of the spindles, however, the clutch 41 is disengaged to interrupt the driving connection between the flywheel shaft 36 and the spindle assemblies 13 and 14. At this point in time, there is little inertia remaining in the rotating spindle assemblies and associated component. Accordingly, rotation of the spindles 13, 14 and their associated weld pieces is rather abruptly stopped once the clutch 41 is disengaged to allow for very precise control over the length of the bonded weld piece. In the operation described above, the finished weld piece would include the non-rotating weld piece 34 and both rotatable weld pieces 32 and 33.

Once the weld is completed, fluid may be introduced into the cylinders 97 through inlet ports 110 to retract the thrust piston 98. Similarly, fluid is introduced into the rapid advance cylinders 95 through inlet ports 106 to retract the spindles 13 and 14 to their positions shown in FIG. 1. In this position, after new weld pieces have been placed in the chucks 16, 17 and the holding fixture 15, a new holding operation may be commenced.

What we claim is:

1. A twin-spindle inertia welding machine comprising a frame structure, each of the spindle assemblies having a rotatable chuck for securing a respective weld piece, the rotatable chucks being arranged upon the respective spindle assemblies in facing relation with each other.

a non-rotating holding fixture mounted upon the frame structure between the spindle assemblies with means effectively interconnecting the spindles and holding fixture for positioning the two spindles relative to the holding fixture, the spindle chucks and holding fixture being adapted to respectively receive rotatable and non-rotatable weld pieces in axial alignment, drive means arranged adjacent one of the spindle assemblies having a rotatable flywheel, motor means for setting the flywheel in rotation and a single output shaft, the motor means being arranged closer to one of the spindle assemblies than the other spindle assembly, and synchronizing means including an elongated shaft assembly for coupling the output shaft with the two spindles so that energy for driving the spindles in rotation is substantially provided by the flywheel, one of the chucks having a relatively larger moment of inertia than the other chuck for overcoming angular misalignment between the two rotatable weld pieces as caused by the relative position of the motor means and its interconnection with the two spindles by the single output shaft.

2. The welding machine of claim 1 wherein the elongated shaft assembly of the synchronizing means comprises two shaft portions coupled respectively to the spindle assemblies and to each other by means of a coupling capable of allowing angular adjustment between the two shaft portions.

3. A twin-spindle inertia welding machine comprising a frame structure, a pair of rotatable spindle assemblies mounted upon the frame structure, each of the spindle assemblies having a rotatable chuck for securing a respective weld piece, the rotatable chucks arranged upon the respective spindle assemblies in facing relation with each other, a non-rotating holding fixture mounted upon the frame structure between the spindle assemblies with means effectively interconnecting the spindles and holding fixture for positioning the two spindles relative to the holding fixture, the spindle chucks and holding fixture being adapted to respectively receive rotatable and non-rotatable weld pieces in axial alignment, drive means having a rotatable flywheel, motor means for setting the flywheel in rotation and a single output shaft, and synchronizing means including an elongated shaft assembly for coupling the single output shaft with the two spindles so that energy for driving the spindles in rotation is substantially provided by the flywheel, the elongated shaft assembly of the synchronizing means comprising two shaft portions coupled respectively to the spindle assemblies and to each other by means of a coupling capable of allowing for angular adjustment between the two shaft portions.

4. A twin-spindle inertia welding machine comprising a frame structure,
  a pair of rotatable spindle assemblies both mounted for axial movement upon the frame structure, each of the spindle assemblies having a rotatable chuck for securing a respective weld piece, the rotatable chucks being arranged upon the respective spindle assemblies in facing relation with each other,
  a non-rotating holding fixture mounted in fixed relation upon the frame structure between the spindle assemblies with means effectively interconnecting the spindles and holding fixture for positioning the two spindles relative to the holding fixture, the spindle chucks and holding fixture being adapted to respectively receive rotatable and non-rotatable weld pieces in axial alignment,
  single drive means having a rotatable flywheel, motor means for setting the flywheel in rotation and a single output shaft,
  synchronizing means including an elongated shaft assembly for coupling the single output shaft with the two spindles so that energy for driving the spindles in rotation is substantially provided by the flywheel, and a tailstock fixture associated with each of the movable spindle assemblies and secured in place upon the frame structure, a double-acting hydraulic ram being interconnected between each tailstock assembly and the associated spindle assembly,
  the drive means being arranged at one end of the frame structure adjacent one of the tailstock assemblies, the output shaft of the drive means being coupled to the synchronizing means by a clutch which is operable to selectively couple and uncouple the drive means from the two spindles.

5. A twin-spindle inertia welding machine of the type wherein energy for driving relatively rotatable weld pieces is substantially supplied by a flywheel means which is set in rotation at a preselected speed by motor means, comprising
  a frame structure,
  a pair of spindle assemblies mounted upon the frame structure, each of the spindle assemblies having a rotatable chuck for securing a respective weld piece, the rotatable chucks arranged upon the respective spindle assemblies in facing relation with each other,
  a non-rotatable holding fixture mounted upon the frame structure between the spindle assemblies,
  means providing for axial movement between the spindles and the holding fixture,
  an output shaft coupled to the flywheel means,
  a synchronizing shaft connected to the output shaft and at its opposite ends to the respective spindle assemblies, the synchronizing shaft comprising two separate portions respectively coupled with the two spindle assemblies, the shaft portions being interconnected by means of a coupling allowing for angular adjustment between the two shaft portions, and
  a clutch arranged between the output shaft and the synchronizing shaft for selectively coupling and uncoupling the two spindles from the flywheel means.

6. The welding machine of claim 5 wherein the spindle assemblies are provided with different moments of inertia.

7. A twin-spindle inertia welding machine of the type wherein energy for driving relatively rotatable weld pieces is substantially supplied by flywheel means which are set in rotation at a preselected speed by motor means, comprising
  a frame structure,
  a pair of spindle assemblies mounted upon the frame structure, each of the spindle assemblies having a rotatable chuck for securing a respective weld piece, the rotatable chucks being arranged upon the respective spindle assemblies in facing relation with each other, the spindle assemblies being provided with different moments of inertia, for overcoming angular misalignment between the two rotatable weld pieces,
  a non-rotatable holding fixture mounted upon the frame structure between the spindle assemblies,
  means providing for axial movment between the spindles and the holding fixture,
  an output shaft coupled to the flywheel means,
  a synchronizing shaft connected to the output shaft and at its opposite ends to the respective spindle assemblies, and
  a clutch arranged between the output shaft and the synchronizing shaft for selectively coupling and uncoupling the two spindles from the flywheel means.

* * * * *